(12) United States Patent
Park

(10) Patent No.: US 11,238,647 B2
(45) Date of Patent: Feb. 1, 2022

(54) APPARATUS FOR BUILDING MAP USING MACHINE LEARNING AND IMAGE PROCESSING

(71) Applicant: DABEEO INC., Gangseo-gu Seoul (KR)

(72) Inventor: Ju Hum Park, Bucheon-si (KR)

( * ) Notice: Subject to any disclaimer, the term of this patent is extended or adjusted under 35 U.S.C. 154(b) by 0 days.

(21) Appl. No.: 16/084,046

(22) PCT Filed: Apr. 12, 2018

(86) PCT No.: PCT/KR2018/004294
§ 371 (c)(1),
(2) Date: Sep. 11, 2018

(87) PCT Pub. No.: WO2019/054593
PCT Pub. Date: Mar. 21, 2019

(65) Prior Publication Data
US 2021/0209841 A1    Jul. 8, 2021

(30) Foreign Application Priority Data

Sep. 13, 2017 (KR) .......................... 10-2017-0117124

(51) Int. Cl.
*G06T 17/05* (2011.01)
*G06N 20/00* (2019.01)
(Continued)

(52) U.S. Cl.
CPC ............ *G06T 17/05* (2013.01); *G06K 9/6256* (2013.01); *G06N 3/08* (2013.01); *G06N 20/00* (2019.01); *G06T 17/10* (2013.01)

(58) Field of Classification Search
CPC ....... G06T 17/05; G06T 17/10; G06K 9/6256; G06N 20/00; G06N 3/08
See application file for complete search history.

(56) References Cited

U.S. PATENT DOCUMENTS

| | | | | |
|---|---|---|---|---|
| 5,521,722 A | * | 5/1996 | Colvill | G06F 3/1208 101/211 |
| 7,327,897 B2 | * | 2/2008 | Choi | G06T 5/006 356/139.03 |

(Continued)

FOREIGN PATENT DOCUMENTS

| | | |
|---|---|---|
| CN | 103703490 A | 4/2014 |
| JP | 2003-150046 A | 5/2003 |

(Continued)

OTHER PUBLICATIONS

Abdusalomov et al.; "Robust Shadow Removal Technique for Improving Image Enhancement Based on Segmentation Method"; IOSR Journal of Electronics and Communication Engineering; vol. 11; Version III; 2016; p. 17-21.

(Continued)

*Primary Examiner* — Grace Q Li
(74) *Attorney, Agent, or Firm* — Baker Hostetler LLP

(57) ABSTRACT

An apparatus for building a map is disclosed. The apparatus for building a map according to the present invention includes a data collection unit configured to separately collect vector data and raster data, a vector data processing unit configured to generate ground-truth images of a previously set size by processing the vector data, a raster data processing unit configured to generate divided raster images of the set size by processing the raster data, and a polygon generation unit configured to generate predicted polygons through machine learning of the ground-truth images and the divided raster images and generate polygons which can be applied to map building based on the raster data on the basis of the predicted polygons and the ground-truth images.

15 Claims, 14 Drawing Sheets

(51) Int. Cl.
*G06N 3/08* (2006.01)
*G06K 9/62* (2006.01)
*G06T 17/10* (2006.01)

(56) References Cited

U.S. PATENT DOCUMENTS

| | | | |
|---|---|---|---|
| 9,280,843 B1 | 3/2016 | Cui | |
| 2002/0070932 A1* | 6/2002 | Kim | G06T 15/00 345/419 |
| 2009/0037102 A1* | 2/2009 | Yokoyama | G01C 21/36 701/431 |
| 2013/0004065 A1* | 1/2013 | Ma | G06T 7/90 382/165 |
| 2017/0250751 A1* | 8/2017 | Kargieman | G06K 9/46 |
| 2018/0262683 A1* | 9/2018 | Meler | H04N 5/265 |
| 2019/0072407 A1* | 3/2019 | Fang | G06F 3/04845 |

FOREIGN PATENT DOCUMENTS

| | | |
|---|---|---|
| JP | 2006-48070 A | 2/2006 |
| JP | 2010-15448 A | 1/2010 |
| JP | 2012-118666 A | 6/2012 |
| JP | 2014-202745 A | 10/2014 |
| JP | 2017-33197 A | 2/2017 |
| KR | 2005-0097618 A | 10/2005 |
| KR | 100586034 B1 | 6/2006 |
| KR | 10-1212788 B1 | 12/2012 |
| KR | 2014-0099183 A | 8/2014 |
| KR | 2015-0007324 A | 1/2015 |
| WO | 2013/002280 A1 | 1/2013 |
| WO | 2017/038291 A1 | 3/2017 |

OTHER PUBLICATIONS

Maggiori, et al., "High-Resolution Semantic Labeling with Convolutional Neural Networks", Arxiv. Org, Cornell University, Nov. 7, 2016.

Abdusalomov, et al., "Robust Shadow Removal Technique for Improving Image Enhancement Based on Segmentation Method", IOSR Journal of Electronics and Communication Engineering (IOSR-JECE), vol. 11, Issue 5, Ver. III, pp. 2278-2834, Oct. 31, 2016.

"Ramer-Douglas-Peucker algorithm"; https://en.wikipedia.org/w/index.php?title=Ramer-Douglas-Peucker_algorithm&oldid=796757909; Wikipedia; Nov. 2020; accessed Dec. 16, 2020; 3 pages.

Shi et al.; "Performance Evaluation of Line Simplification Algorithms for Vector Generalization"; The Cartographic Journal; vol. 43; Mar. 2006; p. 27-44.

Ito et al.; "Assessing the Land Cover Classification Technique of the Satellite Imagery using Deep Learning"; The 30th Annual Conf. of the Japanese Society for Artificial Intelligence; 2016; 4 pages (contains English Abstract).

* cited by examiner

APPARATUS FOR BUILDING MAP USING MACHINE LEARNING AND IMAGE PROCESSING

CROSS-REFERENCE TO RELATED APPLICATIONS

This application is a National Stage of International patent application PCT/KR2018/004294, filed on Apr. 12, 2018, which claims priority to foreign Korean patent application No. KR 10-2017-0117124, filed on Sep. 13, 2017, the disclosures of which are incorporated by reference in their entirety.

FIELD OF THE INVENTION

The present invention relates to an apparatus for building a map using machine learning and image processing, and more particularly, to an apparatus for building a map using machine learning and image processing, the apparatus automatically building a map in a manner of deep learning based on a convolution neural network (CNN) among machine learning methods.

BACKGROUND

With the development of map-related technologies which are provided to electronic information terminals, various forms of location-based services (LBSs) which are provided from maps are under development.

LBSs include a point of interest (POI) information service for providing phone numbers of business entities, addresses of business entities, and detailed information, a traffic condition information service, a geographical information panorama service, such as road view and aerial virtual reality (VR), which shows a user actual geographic features generated in the form of a photographic panorama, and the like.

In this regard, OpenStreetMap has been lately provided as an open map service.

OpenStreetMap is a map service in which users personally create a map. Since each user can personally build a map as necessary, OpenStreetMap has come into use in various fields together with Google Maps.

As background art related to the present invention, there is Korean Patent Publication No. 10-2005-0097618 (Oct. 10, 2005) "System and Method for Making Digital Map Using GPS and INS."

As for maps provided by existing navigation systems or web sites, users personally classify buildings or roads by looking at satellite pictures and making decisions and produce maps in new forms by manually drawing buildings, roads, or the like.

However, since the existing method involves users manually creating maps in person, there are problems that it takes a long time to build a map, production costs are high, and the accuracy of a map is degraded due to a wrong operation or mistake of a user.

Also, since the existing method involves manually looking for data of frequently changed buildings and roads to update the data with latest information, it is not easy to update a map.

To solve the above-described problems of the conventional art, the present invention is directed to providing an apparatus for building a map using machine learning and image processing, the apparatus automatically building a map through raster data on the basis of deep learning, that is, machine learning, of training data divided based on vector data and training data divided based on the raster data.

The present invention is also directed to providing an apparatus for building a map using machine learning and image processing, the apparatus making it possible to reduce mistakes during map creation and improve the accuracy of a map because it is possible to automatically build a map using raster data.

SUMMARY OF THE INVENTION

One aspect of the present invention provides an apparatus for building a map using machine learning and image processing, the apparatus including: a data collection unit configured to separately collect vector data and raster data; a vector data processing unit configured to generate ground-truth images of a previously set size by processing the vector data; a raster data processing unit configured to generate divided raster images of the set size by processing the raster data; and a polygon generation unit configured to generate predicted polygons through machine learning of the ground-truth images and the divided raster images and generate polygons which can be applied to map building based on the raster data on the basis of the predicted polygons and the ground-truth images.

The vector data processing unit of the present invention may include a data parsing unit configured to separately parse the pieces of vector data so that formats or coordinate systems of the pieces of vector data coincide with each other when at least one of the file formats or the coordinate systems of the vector data differ from each other.

The vector data processing unit of the present invention may include: a map generation unit configured to generate a map using the vector data and color-code respective classes of the map; and a vector data dividing unit configured to generate the ground-truth images by dividing the map into sections of the set size.

The map generation unit of the present invention may color-code the respective classes of the map in different colors.

The set size of the present invention may be a training data size preset for machine learning.

The raster data processing unit of the present invention may include a raster data dividing unit configured to generate a preset number or more of divided raster images for machine learning by dividing the raster data into pieces of the set size.

The raster data processing unit of the present invention may include a coordinate correction unit configured to correct coordinates of the raster data with coordinates of an actual map according to an accuracy of reference coordinates of the raster data.

The raster data processing unit of the present invention may include an image correction unit configured to remove machine learning hindrance elements present in the divided raster images.

The polygon generation unit of the present invention may include: a polygon prediction unit configured to generate the predicted polygons through machine learning of the ground-truth images and the divided raster images; a vector data conversion unit configured to generate predicted vector data by converting the predicted polygons into vector data; and an accuracy verification unit configured to verify an accuracy of the predicted vector data by comparing the ground-truth images and the predicted vector data and determine the predicted polygons as polygons which can be applied to map building based on the raster data according to a verification result.

The polygon generation unit of the present invention may recognize shapes of the predicted polygons depending on classes through machine learning of the ground-truth images and the divided raster images and predict positions by classifying the predicted polygons.

The vector data conversion unit of the present invention may convert the predicted polygons into the predicted vector data using a vector tracking technique depending on classes.

The accuracy verification unit of the present invention may determine the accuracy by comparing parts of the ground-truth images and the predicted vector data overlapping each other in pixel-level units.

The accuracy verification unit of the present invention may determine whether the predicted polygons can be applied to map building based on the raster data on the basis of whether the accuracy of the predicted vector data with respect to the ground-truth images is a previously set value or more.

When the accuracy is less than the set value, the accuracy verification unit of the present invention may cause the polygon prediction unit to repeat machine learning of the ground-truth images to improve the accuracy of the predicted vector data.

The polygon generation unit of the present invention may include a shape adjustment unit configured to adjust the predicted polygons to polygon shapes that can be applied to map building based on the raster data.

The shape adjustment unit of the present invention may adjust side shapes of the predicted polygons and minimize the number of nodes of the predicted polygons so that the predicted polygons can be applied to map building based on the raster data.

The apparatus for building a map using machine learning and image processing according to an aspect of the present invention can automatically build a map through raster data on the basis of machine learning of training data divided based on vector data and training data divided based on the raster data.

Since the apparatus for building a map using machine learning and image processing according to another aspect of the present invention can automatically build a map using raster data, it is possible to reduce mistakes during map creation and improve the accuracy of a map.

DETAILED DESCRIPTION

Figure 1:
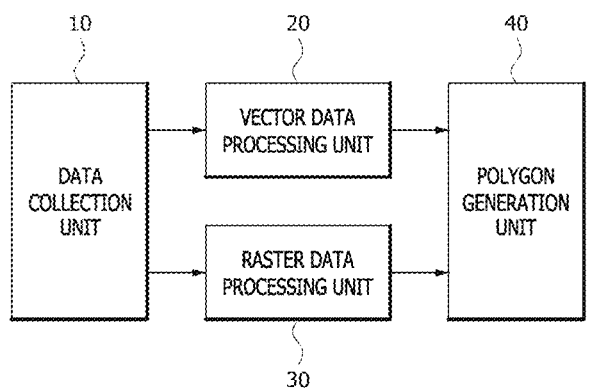
FIG. 1 is a block diagram of an apparatus for building a map using machine learning and image processing according to an embodiment of the present invention.

Hereinafter, an apparatus for building a map using machine learning and image processing according to an embodiment of the present invention will be described in detail with reference to the accompanying drawings. In the drawings, the thicknesses of lines, the sizes of elements, etc. may be exaggerated for clarity and convenience of illustration. Further, terms described below are defined in consideration of functionality in the present invention and may vary depending on an intention or a practice of a user or a manager. Therefore, the definitions of the terms should be made based on the overall content of this specification.

FIG. 1 is a block diagram of an apparatus for building a map using machine learning and image processing according to an embodiment of the present invention.

Referring to FIG. 1, the apparatus for building a map using machine learning and image processing according to an embodiment of the present invention includes a data collection unit 10, a vector data processing unit 20, a raster data processing unit 30, and a polygon generation unit 40.

The data collection unit 10 collects vector data and raster data from various sources.

The vector data may include a digital map, a digital topographic map, or the like, and the raster data may include a satellite picture, a building picture, or the like.

Here, the digital topographic map may be formed in various formats, such as Shapefile, NGI, GeoJson, and Pbf. The raster data may be classified as a satellite picture, an aerial picture, a drone picture, or the like, and classified as a red green blue (RGB) image, a multispectral image, a hyperspectral image, or the like according to a camera sensor.

When the data collection unit 10 collects vector data and raster data, the vector data processing unit 20 and the raster data processing unit 30 generate ground-truth images and divided raster images, respectively. This will be described with reference to FIGS. 2 to 8.

Figure 2:
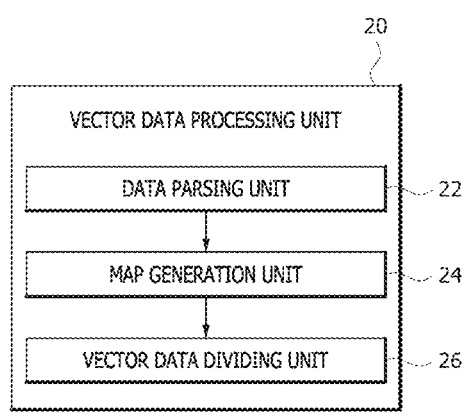
FIG. 2 is a block diagram of a vector data processing unit according to an embodiment of the present invention.
Figure 3:
FIG. 3 is an example diagram of vector data according to an embodiment of the present invention.
Figure 4:
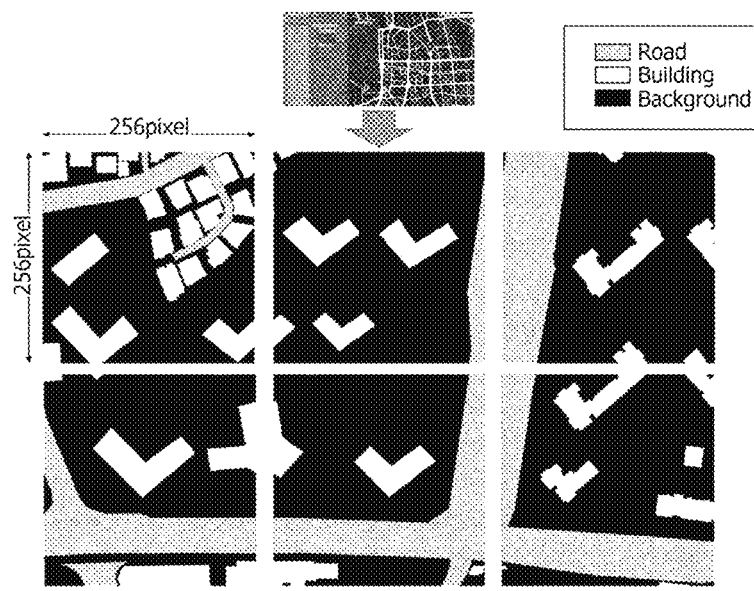
FIG. 4 is an example diagram of a vector data image divided into sections of a training data size after color coding according to an embodiment of the present invention.

FIG. 2 is a block diagram of a vector data processing unit according to an embodiment of the present invention, FIG. 3 is an example diagram of vector data according to an embodiment of the present invention, and FIG. 4 is an example diagram of ground truth divided into sections of a training data size after color coding according to an embodiment of the present invention.

The vector data processing unit 20 generates a ground-truth image of a previously set size by processing the vector data collected by the data collection unit 10. The set size will be described below.

Referring to FIG. 2, the vector data processing unit 20 includes a data parsing unit 22, a map generation unit 24, and a vector data dividing unit 26.

When at least one of file formats or coordinate systems of the pieces of vector data differ from each other, the data parsing unit 22 parses each piece of vector data so that the formats or the coordinate systems of the pieces of vector data coincide with each other.

The pieces of vector data collected by the data collection unit 10 may have different formats, such as Shapefile, NGI, GeoJson, and Pbf, as mentioned above or may use different coordinate systems depending on pieces of numerical data.

When the pieces of vector data have different formats or different coordinate systems, compatibility therebetween may be degraded. Therefore, it is necessary to unify their formats or coordinate systems.

Accordingly, when file formats of the pieces of vector data differ from each other, the data parsing unit 22 unifies the file formats by parsing the corresponding pieces of vector data, and when coordinate systems of the pieces of vector data differ from each other, the data parsing unit 22 unifies the coordinate systems by parsing the corresponding pieces of vector data.

The map generation unit 24 generates a map using the vector data whose formats or coordinate systems are unified by the data parsing unit 22 and color-codes respective classes of the map in different colors.

The map generation unit 24 generates a map using the vector data as shown in FIG. 3. Further, since it is possible to query the map, which has been generated using the vector data, depending on respective classes, such as roads, buildings, forests, and bodies of water, the map generation unit 24 color-codes the map depending on the respective classes including roads, buildings, forests, and bodies of water.

The vector data dividing unit 26 generates ground-truth images by dividing the map into sections of the set size.

As shown in FIG. 4, the vector data dividing unit 26 may generate a plurality of, for example, 100,000, ground-truth images by dividing the map, which has been color-coded by the map generation unit 24, into sections of the set size and rendering the divided sections.

Here, the set size is a defined size of ground-truth images and may be set in units of pixels. The case in which the set size is set to 256×256 according to this embodiment will be described as an example.

The set size corresponds to a training data size that is set suitably for machine learning described below. Machine learning will be described below.

Since a map is divided into sections of a set size, a plurality of ground-truth images may be generated from one map.

FIG. 4 shows that roads, buildings, and a background in a map are color-coded respectively in yellowish green, white, and black and a total of 6 ground-truth images are generated from the map.

As described above, after unifying file formats or coordinate systems of the pieces of vector data, the vector data processing unit 20 generates a map through corresponding numerical data and color-codes the map depending on classes. Subsequently, the vector data processing unit 20 divides the color-coded map into sections of the set size and renders the divided sections, thereby generating a plurality of ground-truth images.

Figure 5:
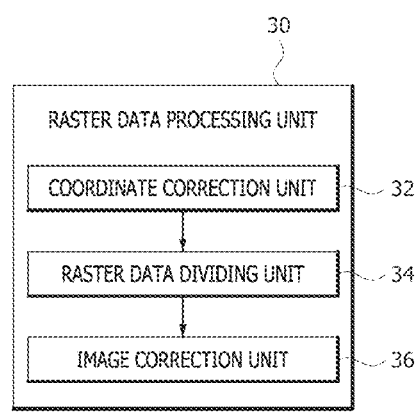
FIG. 5 is a block diagram of a raster data processing unit according to an embodiment of the present invention.
Figure 6:
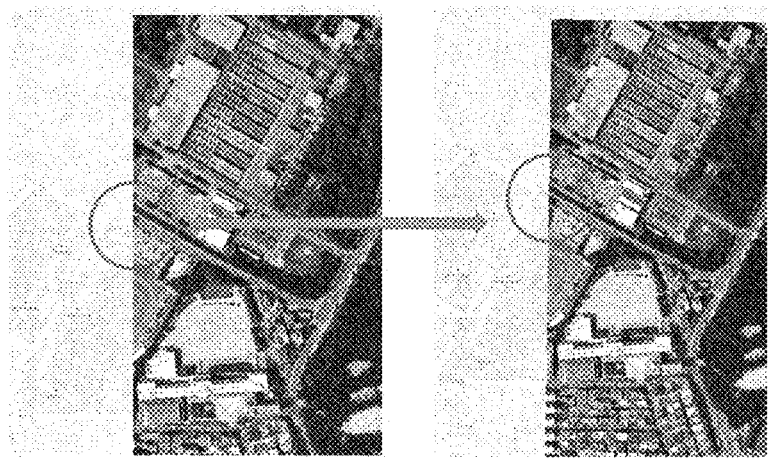
FIG. 6 shows an example of latitudinal and longitudinal correction of raster data according to an embodiment of the present invention.
Figure 7:
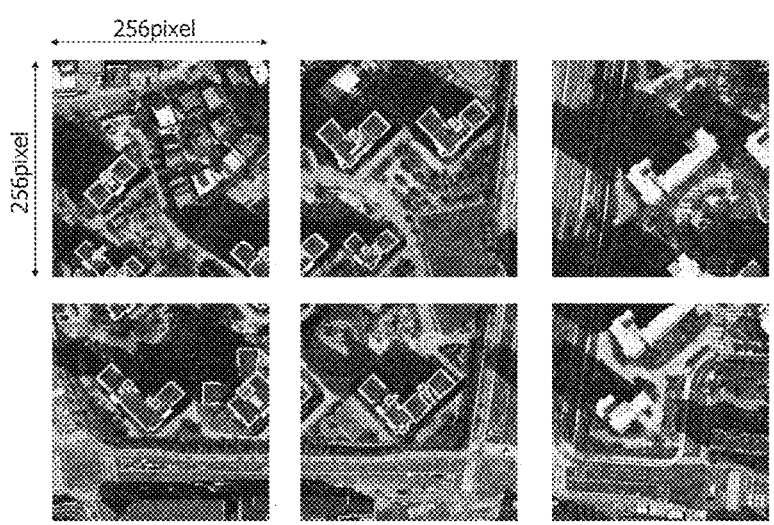
FIG. 7 shows a raster image divided into sections of a training data size on the basis of raster data according to an embodiment of the present invention.
Figure 8:
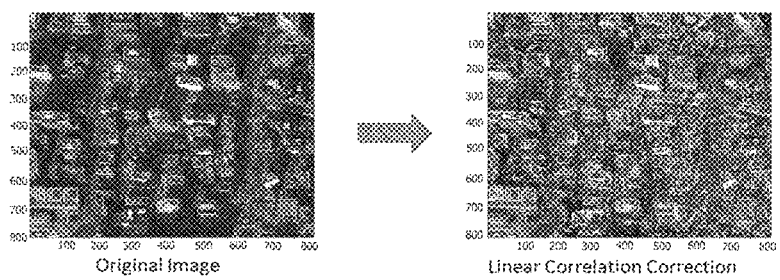
FIG. 8 shows an example of image correction based on image processing according to an embodiment of the present invention.

FIG. 5 is a block diagram of a raster data processing unit according to an embodiment of the present invention, FIG. 6 shows an example of latitudinal and longitudinal correction of raster data according to an embodiment of the present invention, FIG. 7 shows test tiles which have been divided into sections of a training data size on the basis of raster data according to an embodiment of the present invention, and FIG. 8 shows an example of image correction based on image processing of test tiles according to an embodiment of the present invention.

The raster data processing unit 30 generates divided raster images by processing the raster data.

Referring to FIG. 5, the raster data processing unit 30 includes a coordinate correction unit 32, a raster data dividing unit 34, and an image correction unit 36.

The coordinate correction unit 32 corrects coordinates of the raster data with coordinates of an actual map according to an accuracy of reference coordinates of the raster data.

When reference coordinates are inaccurate, raster data such as a satellite picture may have inaccurate coordinates as shown in the red circle on the left picture of FIG. 6. For this reason, it is necessary to correct the inaccurate coordinates to coincide with those of an actual digital map as shown in the red circle on the right picture of FIG. 6. This is because accuracy of machine learning, which will be described below, is degraded when reference coordinates of raster data are inaccurate.

Accordingly, as shown in FIG. 6, the coordinate correction unit 32 corrects coordinates of the raster data with coordinates of the actual map according to the accuracy of reference coordinates of the raster data.

The raster data dividing unit 34 divides the raster data whose coordinates have been corrected by the coordinate correction unit 32 into pieces of the same size as the ground-truth images, that is, the set size, thereby generating a plurality of, for example, 100,000, divided raster images.

FIG. 7 shows a plurality of raster images divided by the raster data dividing unit 34. Each divided raster image has a size of 256 pixels×256 pixels, which is the same as the size of the ground-truth images.

The image correction unit 36 removes machine learning hindrance elements present in the plurality of divided raster images generated by the raster data dividing unit 34.

In general, machine learning hindrance elements may be present in each of the divided raster images generated by the raster data dividing unit 34.

The machine learning hindrance elements may include shadows of buildings and the like.

Accordingly, the image correction unit 36 determines whether machine learning hindrance elements are present in the divided raster images and removes, when machine learning hindrance elements are present, the machine learning hindrance elements by correcting corresponding divided raster images through image processing.

In the divided raster image on the left side of FIG. 8, machine learning hindrance elements, that is, shadows, are present due to respective buildings. On the contrary, it is possible to see that all the shadows have been removed from the divided raster image on the right side of FIG. 8 through image processing by the image correction unit 36.

As described above, the raster data processing unit 30 corrects coordinates of the raster data with coordinates of the actual map according to the accuracy of reference coordinates of the raster data and generates the plurality of divided raster images by dividing the corrected raster data into pieces of the set size. Subsequently, the raster data processing unit 30 processes the divided raster images, thereby removing machine learning hindrance elements present in the divided raster images.

Meanwhile, when the ground-truth images are generated by the vector data processing unit 20 and the divided raster images are generated by the raster data dividing unit 34 as described above, the polygon generation unit 40 generates polygons using the ground-truth images and the divided raster images on the basis of machine learning. This is described with reference to FIGS. 9 to 13.

Figure 9:
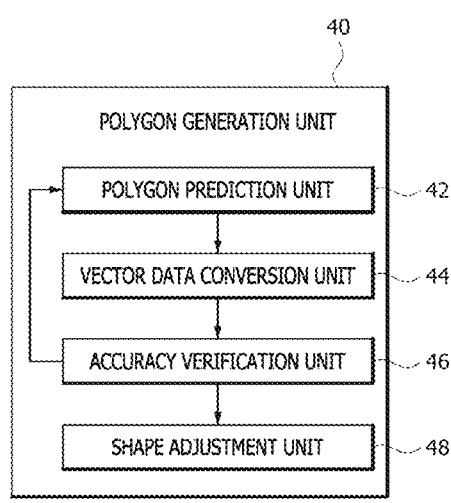
FIG. 9 is a block diagram of a polygon generation unit according to an embodiment of the present invention.
Figure 10:
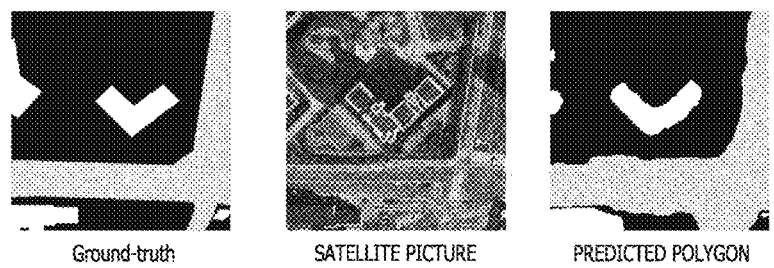
FIG. 10 shows an example of predicting a polygon through machine learning of ground truth and a divided raster image according to an embodiment of the present invention.
Figure 11:
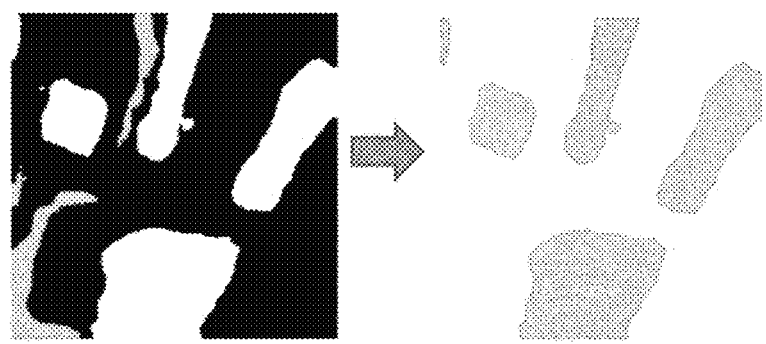
FIG. 11 shows an example of converting predicted polygons into predicted vector data according to an embodiment of the present invention.
Figure 12:
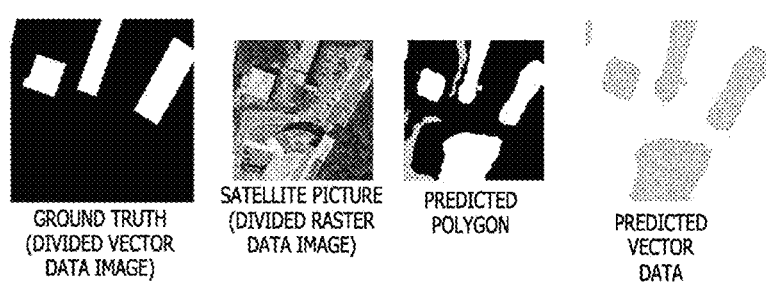
FIG. 12 shows an example of verifying accuracy by comparing ground truth and predicted vector data according to an embodiment of the present invention.
Figure 13:
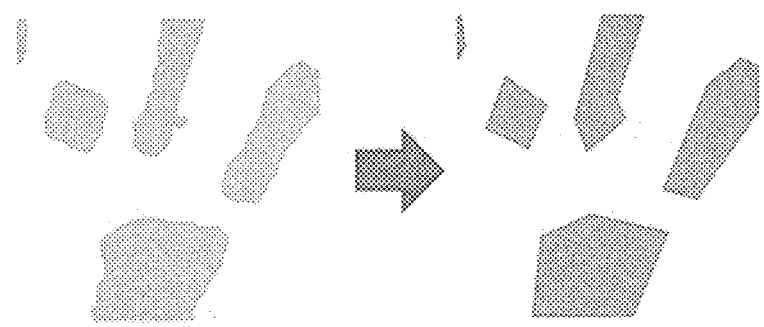
FIG. 13 shows an example of adjusting the shapes of polygons according to an embodiment of the present invention.

FIG. 9 is a block diagram of a polygon generation unit according to an embodiment of the present invention, FIG. 10 shows an example of predicting a polygon through machine learning of ground truth and a test tile according to an embodiment of the present invention, FIG. 11 shows an example of converting predicted polygons into predicted vector data according to an embodiment of the present invention, FIG. 12 shows an example of verifying accuracy by comparing ground truth and predicted vector data according to an embodiment of the present invention, and FIG. 13 shows an example of adjusting the shapes of polygons according to an embodiment of the present invention.

The polygon generation unit 40 generates predicted polygons through machine learning of the ground-truth images generated by the vector data processing unit 20 and the divided raster images generated by the raster data processing unit 30 and generates polygons that can be applied to map building based on the raster data on the basis of the predicted polygons and the ground-truth images.

Referring to FIG. 9, the polygon generation unit 40 includes a polygon prediction unit 42, a vector data conversion unit 44, an accuracy verification unit 46, and a shape adjustment unit 48.

The polygon prediction unit 42 predicts polygons through machine learning of the ground-truth images generated by the vector data processing unit 20 and the divided raster images, thereby generating predicted polygons.

Here, a convolution neural network (CNN)-based deep learning method may be used as a machine learning method.

The polygon prediction unit 42 generates predicted polygons from the divided raster images through machine learning on the basis of the ground-truth images as shown in FIG. 10. In this case, the polygon prediction unit 42 recognizes the shapes of predicted polygons depending on classes through machine learning of the ground-truth images and the divided raster images, classifies the predicted polygons, and predicts positions thereof.

The vector data conversion unit 44 generates predicted vector data of the predicted polygons by converting the predicted polygons predicted by the polygon prediction unit 42 into vector data.

In this case, the vector data conversion unit 44 divides the predicted polygons depending on classes as shown in FIG. 11 and converts the predicted polygons into predicted vector data using a vector tracking technique depending on classes.

The accuracy verification unit 46 verifies an accuracy of the predicted vector data by comparing the ground-truth images generated by the vector data processing unit 20 and the predicted vector data generated by the vector data conversion unit 44 and determines the predicted polygons as polygons that can be applied to map building based on the raster data according to a verification result.

Referring to FIG. 12, the accuracy verification unit 46 determines whether the predicted polygons can be applied to map building based on the raster data on the basis of whether the accuracy of the predicted vector data with respect to the ground-truth images is a previously set value or more. Here, the accuracy verification unit 46 determines an accuracy by comparing parts of the ground-truth images and the predicted vector data overlapping each other in pixel-level units.

In this case, the accuracy verification unit 46 compares the parts of the ground-truth images and the predicted vector data overlapping each other in pixel level units and determines a ratio of the parts of the ground-truth images and the predicted vector data overlapping each other, that is, whether the accuracy is the previously set value or more.

The set value is a reference value for determining an accuracy of predicted vector data with respect to ground-truth images. In other words, when a ratio of predicted vector data overlapping ground-truth images is the set value or more, the predicted vector data may be determined to show a very high similarity with the ground-truth images.

When the accuracy is less than the set value, the accuracy verification unit 46 causes the polygon prediction unit 42 to repeat machine learning of the ground-truth images, thereby improving the accuracy of predicted vector data.

In other words, when the accuracy is less than the set value, the accuracy verification unit 46 causes the polygon prediction unit 42 to repeat machine learning of the ground-truth images so that the accuracy of predicted vector data may be improved through such repeated machine learning according to the accuracy.

On the contrary, when the accuracy of the predicted vector data based on machine learning is the set value or more, the shape adjustment unit 48 determines that the predicted polygons can be applied to map building based on the raster data and adjusts the shapes of the predicted polygons.

Predicted polygons extracted by machine learning have uneven sides. Therefore, when the predicted polygons are vectorized through a vector tracer, a large number of nodes are obtained, and data sizes of the predicted polygons are relatively very large. Accordingly, it is necessary to minimize loss of predicted polygons and the number of nodes.

For this reason, as shown in FIG. 13, the shape adjustment unit 48 adjusts side shapes of the predicted polygons and minimizes the number of nodes so that the predicted polygons can be applied to map building based on the raster data.

A method of building a map using machine learning and image processing according to an embodiment of the present invention will be described below with reference to FIG. 14.

Figure 14:
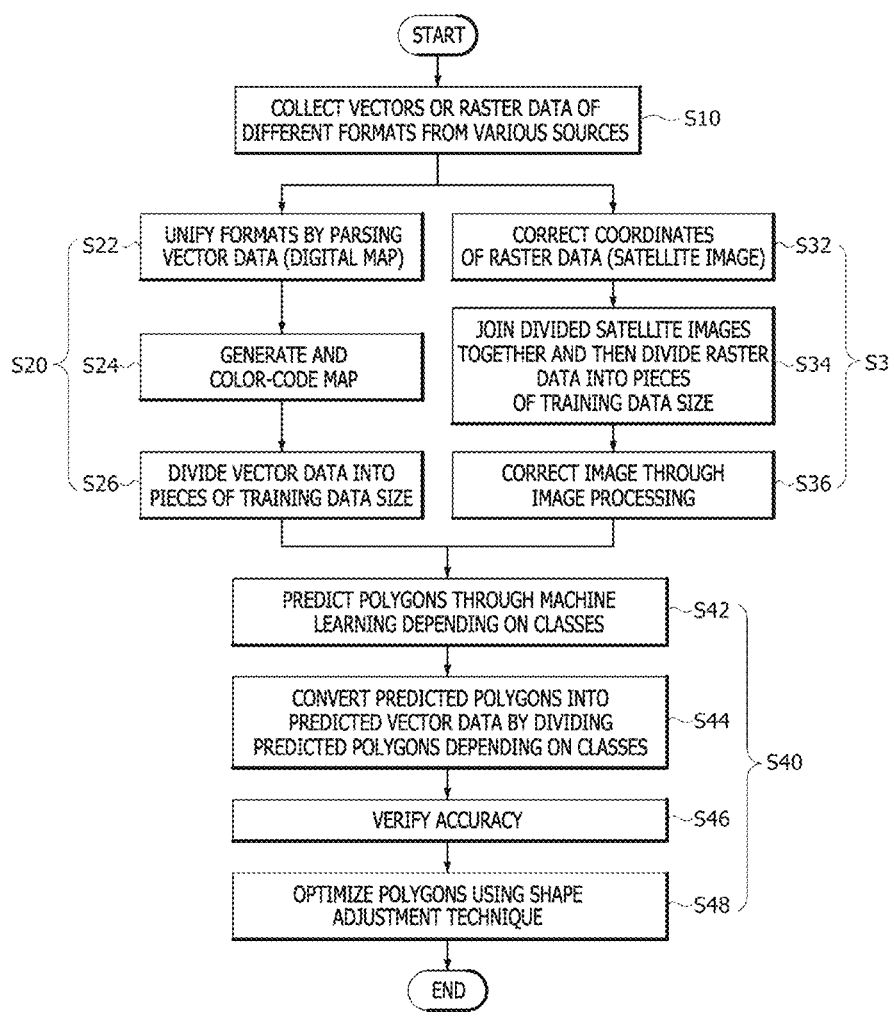
FIG. 14 is a flowchart illustrating a method of building a map using machine learning and image processing according to an embodiment of the present invention.

FIG. 14 is a flowchart illustrating a method of building a map using machine learning and image processing according to an embodiment of the present invention.

Referring to FIG. 14, first, the data collection unit 10 collects vector data and raster data from various sources (S10).

Subsequently, the vector data processing unit 20 generates a map by unifying file formats or coordinate systems of the pieces of vector data, color-codes the generated map depending on classes, and then generates a plurality of ground-truth images by dividing the color-coded map into sections of a set size and rendering the divided sections (S20).

More specifically, the pieces of vector data collected by the data collection unit 10 may have different formats, such as Shapefile, NGI, GeoJson, and Pbf, or may use different coordinate systems depending on pieces of numerical data.

Accordingly, when at least one of file formats or coordinate systems of the pieces of vector data differ from each other, the data parsing unit 22 parses each piece of vector data so that the formats or the coordinate systems coincide with each other.

When formats or coordinate systems of the pieces of vector data are unified by the data parsing unit 22, the map generation unit 24 generates a map using the vector data and color-codes respective classes of the map in different colors (S24). In this case, the map generation unit 24 color-codes the map depending on the respective classes including roads, buildings, forests, bodies of water, etc. of the map.

Subsequently, the vector data dividing unit 26 divides the map color-coded by the map generation unit 24 into sections of the set size and renders the divided sections, thereby generating a plurality of ground-truth images (S26).

Meanwhile, when the raster data is collected by the data collection unit 10, the raster data processing unit 30 corrects coordinates of the raster data according to coordinates of an actual map, generates a plurality of divided raster images by dividing the corrected raster data into pieces of the set size, and then removes machine learning hindrance elements from the divided raster images through image processing of the divided raster images (S30).

More specifically, since raster data such as a satellite picture may have inaccurate reference coordinates, the coordinate correction unit 32 corrects coordinates of the raster data with coordinates of an actual map according to an accuracy of reference coordinates of the raster data (S32).

Subsequently, the raster data dividing unit 34 generates a plurality of divided raster images by dividing the raster data whose coordinates have been corrected by the coordinate correction unit 32 into pieces of the same size as the ground-truth images, that is, the set size (S34).

When the raster data dividing unit 34 generates the divided raster images, the image correction unit 36 removes machine learning hindrance elements present in these divided raster images. In general, machine learning hindrance elements may be present in each of the divided raster images generated by the raster data dividing unit 34. Therefore, the image correction unit 36 determines whether machine learning hindrance elements are present in the divided raster images and removes, when machine learning hindrance elements are present, the machine learning hindrance elements by correcting corresponding divided raster images through image processing (S36).

Meanwhile, when the ground-truth images are generated by the vector data processing unit 20 and the divided raster images are generated by the raster data dividing unit 34 as described above, the polygon generation unit 40 generates predicted polygons through machine learning of the ground-truth images generated by the vector data processing unit 20 and the divided raster images generated by the raster data processing unit 30 and generates polygons that can be applied to map building based on the raster data on the basis of the predicted polygons and the ground-truth images (S40).

More specifically, first, the polygon prediction unit 42 predicts polygons through machine learning of the ground-truth images generated by the vector data processing unit 20 and the divided raster images, thereby generating predicted polygons (S42).

Subsequently, the vector data conversion unit 44 generates predicted vector data of the predicted polygons by converting the predicted polygons generated by the polygon prediction unit 42 into vector data (S44). In this case, the vector data conversion unit 44 divides the predicted polygons depending on classes and converts the predicted polygons into predicted vector data using a vector tracking technique depending on classes.

When the predicted polygons are converted into predicted vector data, the accuracy verification unit 46 verifies an accuracy of the predicted vector data by comparing the ground-truth images generated by the vector data processing unit 20 and the predicted vector data generated by the vector data conversion unit 44 (S46).

In other words, the accuracy verification unit 46 determines whether the predicted polygons can be applied to map building based on the raster data on the basis of whether the accuracy of the predicted vector data with respect to the ground-truth images is a previously set value or more.

Here, when the accuracy is less than the set value, the accuracy verification unit 46 causes the polygon prediction unit 42 to repeat machine learning of the ground-truth images, thereby improving the accuracy of predicted vector data.

On the contrary, when the accuracy of the predicted vector data based on machine learning is the set value or more, the shape adjustment unit 48 adjusts the shapes of the predicted polygons that can be applied to map building based on the raster data (S48). In general, predicted polygons extracted by machine learning have uneven sides. Therefore, the shape adjustment unit 48 adjusts side shapes of the predicted polygons and minimizes the number of nodes of the predicted polygons so that the predicted polygons can be applied to map building based on the raster data.

As described above, the apparatus for building a map using machine learning and image processing according to an embodiment of the present invention can automatically build a map through raster data on the basis of machine learning of training data divided based on vector data and training data divided based on the raster data.

Also, since the apparatus for building a map using machine learning and image processing according to an embodiment of the present invention can automatically build a map using raster data, it is possible to reduce mistakes during map creation and improve the accuracy of a map.

Although the present invention has been described above with reference to embodiments shown in the drawings, the embodiments are illustrative only, and those of ordinary skill in the technical field to which the present invention pertains will understand that various modifications or equivalents can be derived from the embodiments. Therefore, the technical scope of the present invention should be determined by the following claims.

The invention claimed is:

1. A method for building a map using machine learning and image processing comprising:
   separately collecting vector data and raster data;
   generating ground-truth images of a previously set size by processing the vector data;
   generating divided raster images of the set size by processing the raster data; and
   generating predicted polygons through machine learning of the ground-truth images and the divided raster images and generating polygons which can be applied to raster data-based map building based on the predicted polygons and the ground-truth images;
   wherein the predicted polygons are generated through machine learning of the ground-truth images and the divided raster images; and
   predicted vector data is generated by converting the predicted polygons into vector data; and
   an accuracy of the predicted vector data is verified by comparing the ground-truth images and the predicted vector data and the predicted polygons are determined as polygons which can be applied to map building based on the raster data according to a verification result.

2. The method of claim 1, further comprising:
separately parsing the pieces of vector data so that formats or coordinate systems of the pieces of vector data coincide with each other when at least one of the file formats or the coordinate systems of the vector data differ from each other.

3. The method of claim 1, further comprising:
generating a map using the vector data and color-coding respective classes of the map; and
generating the ground-truth images by dividing the map into sections of the set size.

4. The method of claim 3, further comprising:
color-coding the respective classes of the map in different colors.

5. The method of claim 1, wherein the set size is a training data size preset for machine learning.

6. The method of claim 1, further comprising:
generating a preset number or more of divided raster images for machine learning by dividing the raster data into pieces of the set size.

7. The method of claim 1, further comprising:
correcting coordinates of the raster data with coordinates of an actual map according to an accuracy of reference coordinates of the raster data.

8. The method of claim 1, further comprising:
removing machine learning hindrance elements present in the divided raster images.

9. The method of claim 1, further comprising:
recognizing shapes of the predicted polygons depending on classes through machine learning of the ground-truth images and the divided raster images and predicting positions by classifying the predicted polygons.

10. The method of claim 1, further comprising:
converting the predicted polygons into the predicted vector data using a vector tracking technique depending on classes.

11. The method of claim 1, further comprising:
determining the accuracy of the predicted vector data by comparing parts of the ground-truth images and the predicted vector data overlapping each other in pixel-level units.

12. The method of claim 1, further comprising:
determining whether the predicted polygons can be applied to raster data-based map building based on whether the accuracy of the predicted vector data with respect to the ground-truth images is a previously set value or more.

13. The method of claim 12, further comprising:
when the accuracy of the predicted vector data is less than the set value, repeating machine learning of the ground-truth images to improve the accuracy of the predicted vector data.

14. The method of claim 12, further comprising:
adjusting the predicted polygons to polygon shapes which can be applied to map building based on the raster data.

15. The method of claim 14, further comprising:
adjusting side shapes of the predicted polygons and minimizing the number of nodes of the predicted polygons so that the predicted polygons can be applied to map building based on the raster data.

* * * * *